United States Patent [19]

Perreault

[11] 4,141,072
[45] Feb. 20, 1979

[54] FREQUENCY DOMAIN AUTOMATIC EQUALIZER USING MINIMUM MEAN SQUARE ERROR CORRECTION CRITERIA

[75] Inventor: Donald A. Perreault, Thousand Oaks, Calif.

[73] Assignee: Xerox Corporation, Stamford, Conn.

[21] Appl. No.: 755,093

[22] Filed: Dec. 28, 1976

[51] Int. Cl.² .................... H04B 1/10; G06G 7/19; H03H 7/14
[52] U.S. Cl. ............................ 364/553; 325/42; 333/18; 328/167; 364/574; 364/827
[58] Field of Search ............. 325/42; 333/18, 70 T; 328/155, 167; 364/572, 574, 726, 827, 553

[56] References Cited
U.S. PATENT DOCUMENTS

| | | | |
|---|---|---|---|
| 3,755,738 | 8/1973 | Gitlin et al. | 333/18 |
| 3,758,881 | 9/1973 | Rummler | 333/18 |
| 3,864,632 | 2/1975 | Chang | 325/42 |
| 3,868,603 | 2/1975 | Guidoux | 333/18 |
| 4,027,257 | 5/1977 | Perreault | 333/18 |

Primary Examiner—Felix D. Gruber

[57] ABSTRACT

An automatic equalizer for calculating the equalization transfer function of a transmission channel and applying same to equalize received signals. Equalization coefficients are obtained using a mean square error criteria for convergence to the desired values.

16 Claims, 12 Drawing Figures

FREQUENCY DOMAIN AUTOMATIC EQUALIZER USING MINIMUM MEAN SQUARE ERROR CORRECTION CRITERIA

BACKGROUND OF THE INVENTION

The invention pertains to frequency domain automatic equalization for electrical signals used in transmission of information.

Ideally, it is desirable to transmit electrical signals such that no interference occurs between successive symbols. In practice, however, transmission channels are bandlimited and intersymbol interference is controlled utilizing clocked systems with equalization conventionally performed in the time domain.

Most conventional automatic equalizers operate in a feedback mode so that the effects of changes in the equalizer transfer function are monitored and used to produce further changes in the transfer function to obtain the best output signals. In such systems, the measurements of the output signal are made in the time domain. Typically, the transfer function may be constructed in the time domain by adjusting the tap gains of a tapped delay line during an initial training period prior to actual meassage transmission. Examples of such systems are shown in U.S. Pat. Nos. 3,375,473 and 3,292,110.

Frequency domain equalization utilizing time domain adjustments are shown, for example, in the U.S. Pat. No. 3,614,673 issued to George Su Kang. Kang utilizes frequency domain measurement and calculations to produce the time domain impulse response of a transversal filter. The impulse response of the transversal filter is applied to set the weights of the transversal filter.

Other approaches to frequency domain equalization require transmission of the discrete Fourier transform of the source signal and require the use of complex analogue circuitry in obtaining an approximation to the desired equalization. See, for example, Weinstein and Ebert, "Transmission by Frequency — Division Multiplexing Using the Discrete Fourier Transform", *IEEE Transactions on Communication Technology*, Vol. COM-19, No. 5, October 1971, pp. 628-634.

Mean square error techniques in various types of equalizers and filters are described, for example, in U.S. Pat. Nos. 3,763,359; 3,403,340; 3,889,108 and 3,657,669.

SUMMARY OF THE INVENTION

An object of the invention is to provide a frequency domain equalizer employing the discrete. Fourier transform and a frequency correction feedback circuit which is operable to produce a minimum mean square error of the output signals.

A further object of the invention is to provide a frequency domain equalizer using mean square error feedback to provide an alternate approach to frequency zero-forcing techniques, thus allowing minimum error even when the impulse response of the unequalized system exceeds the range of the equalizer.

It is a further object of the invention to provide an alternate approach to generating equalization coefficients in a frequency domain equalizer, as disclosed, for example in applicant's copending application for "Frequency Domain Automatic Equalizer Utilizing the Discrete Fourier Transform", filed July 19, 1976, under Ser. No. 706,703 and assigned to the assignee hereof.

Yet another object of the invention is to utilize time shared circuitry for minimizing circuit complexity and expense.

A frequency domain equalizer of the present invention comprises means for sampling a received time dependent signal, means for providing a frequency-domain representation of the received signal, means for adjusting the frequency-domain representation, means for generating a time-domain representation of the adjusted frequency-domain representation, means responsive to the generated time-domain representation for generating a correction signal associated with the gradient of a minimum mean square error of said received signal, and means for adjusting the frequency-domain representation in accordance with the correction signal.

More particularly, the sampling means provides a plurality of sets of sample values, $x_k$, of the received signal, and each sample set is transformed into the frequency domain by a discrete Fourier transformation. The discrete Fourier transform (DFT) spectral components $X_n$ are multiplied by correction factors $C_n$, the equalizer transfer function components, which are adjusted for convergence in accordance with a minimum mean square error criteria. The equalizer employs overlapping sampling sets for successive sets of values of $x_k$ and utilizes a sparse inverse discrete Fourier transform (DFT) to derive the time domain output signal.

BRIEF DESCRIPTION OF THE DRAWINGS

These are other features and advantages of the invention will become apparent when taken in conjunction with the following specification and drawings wherein.

DETAILED DESCRIPTION OF THE ILLUSTRATIVE EMBODIMENT

Figure 1:
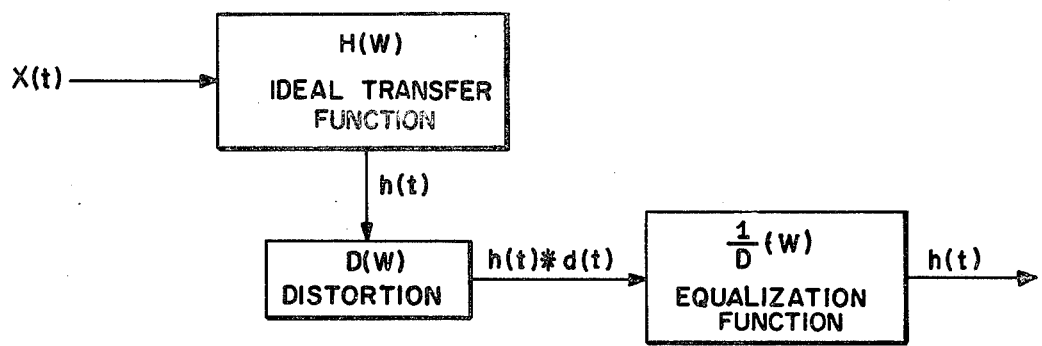
FIG. 1 is a block diagram of the overall theoretical model used in the instant invention.

A block diagram of the model of the transmission system is shown in FIG. 1. The system is assumed linear and it is therefore theoretically immaterial where in the system the distorting elements are located. The transfer function H(w) is a composite of all the ideal elements of the system and is shown in cascade with D(w), which is a composite of all the linear distorting elements of the system. It is assumed that the impulse response h(t) is the ideal symbol and that the information is represented by the magnitude and/or polarity of impulses at the input to H(w) which impulses are spaced in time according to the requirements of h(t) and the detection process. The output of the system before equalization is the Fourier transform of H(w) x D(w), or the convolution of h(t) and d(t), and is no longer ideal. The equalizer is connected in cascade with the distortion network and functions to eliminate the effects of D(w) i.e., the transfer function of the equalizer is 1/D(w). The equalizer precedes the decision point at the receiver, and the system is capable of determining D(w) and then producing the transfer function 1/D(w) in the transmission path.

Figure 2:
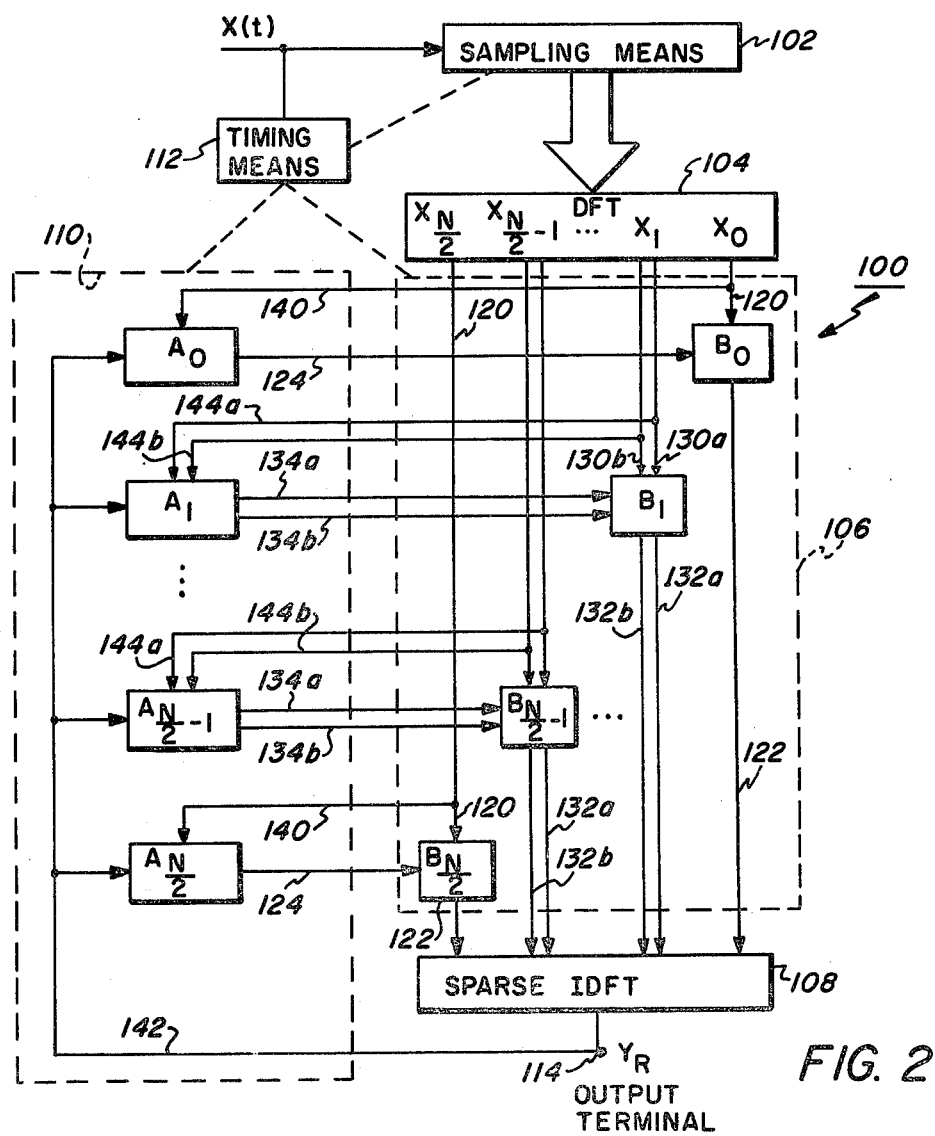
FIG. 2 is a schematic block diagram of the equalizer.

FIG. 2 illustrates a block schematic diagram of the equalizer 100 for producing the equalization transfer function 1/D(w). The equalizer 100 comprises sampling means 102, DFT apparatus 104, coefficient adjustment circuit 106, sparse IDFT apparatus 108, gradient calculation circuit 110 and timing means 112. The equalizer 100 has an output terminal 114 which is fed by the sparse IDFT apparatus 108.

The incoming message signal x(t) is sampled by the sampling means 102 which may comprise, for example, a tapped analog delay line, a plurality of sample and hold circuits or other means to provide sample values $x_k$ of the received signal x(t). The sampling means provides a plurality of sets i of sample values, each sample set time delayed from the adjacent preceeding set a fixed amount $t_0$, where $0 < t_0 \leq T/N$. T is the sample time frame or "window" seen by the equalizer and typically $1/t_0$, the sampling rate, is taken to be at least the Nyquist rate for the signal x(t). The transform sampling rate is given by N/T. Each sample set i is designated by values $x_k$, k = 0, 1 ... N−1, where N is the integral number of sample values within the equalizer window. The total integral number of discrete sample values for a given signal x(t) is represented by $x_k$ where k = 0, 1 ... $N_1$−1, and $N_1$ may be greater than N. Assuming that $t_0 = T/N$, the sampling means 102 provides an overlapping sliding window sampling of the received signal x(t) such that in forming sample sets i, the oldest sample within the window is discarded, intermediate samples shifted an amount $t_0$, and a new sample value taken into the window. Sample set i having sample values $x'_k$ is thus formed from sample set i-1 having values $x_k$ according to the following relationship:

| | |
|---|---|
| $x_k' = x_{k+1}$, | k = 0,1...N-2 |
| $x_k' =$ new sample, | k = N-1 |

Sample value $x'_{N-1}$ is taken time displaced from the preceeding sample values $x'_{N-2}$ by an amount $t_0$. As explained more fully in the above mentioned copending application, an overlapping sliding window sampling of the incoming signal x(t) insures that the frequency domain equalization corresponds to an aperiodic convolution of the time signal x(t) with the impulse response of the equalizer.

If the sampling rate $1/t_0$ is greater than N/T, appropriate storage is provided to store sample points intermediate the N transform sample points, and these stored samples are sequentially shifted to form the transform sample points $x_k$. The only effect of the higher sampling rate is to produce a proportionate separation of the sampled spectrum images.

Referring again to FIG. 2, the output of the sampling means 102 comprises a plurality of sample values $x_k$, k = 0, 1 ... N−1. (N is simply the number of taps on the delay line or the number of stages in the sample and hold circuit or input shift register.) The sample values $x_k$ are fed to the DFT apparatus 104 which provides components $X_n$, corresponding to the DFT of the sample set received. In general, the DFT components $X_n$ are complex and n = 0, 1 ... N−1. In the preferred embodiment of the instant invention, the DFT apparatus 104 is specifically tailored for real incoming sample values $x_k$, and N is an even integer. Under these assumptions, the components $X_0$ and $X_{N/2}$ have only real parts and further the components $X_n$ for n > N/2 are the complex conjugates for the corresponding components with n < N/2. Consequently, only the non-redundant components $X_n$ need be formed so that n = 0, 1 ... N/2 or alternately, n = 0, N/2, N/2 + 1, N/2 + 2 ... N−1. The preferred embodiment using purely real sample values $x_k$ with n having values in the range 0, 1 ... N/2 is utilized herein; in general, however, $x_k$ may be complex, and n may range over the values n = 0, 1 ... N−1.

The output components of the DFT apparatus 104 are provided to multipliers $B_0 ... B_{N/2}$ of the coefficient adjustment circuit 106. Multipliers $B_0$ and $B_{N/2}$ are simple multipliers in that only real values are multiplied therein. Consequently, in FIG. 2, only single input lines 120 and 124 and a single output line 122 are shown interconnecting multipliers $B_0$ and $B_{N/2}$ to the DFT apparatus 104, gradient calculation circuit 110 and sparse IDFT apparatus 108. Multipliers $B_1 ... B_{N/2-1}$ are complex multipliers and require real and imaginary coefficient values for the inputs and outputs. Consequently, double lines 130a-b, 132a-b and 134a-b are shown interconnecting the complex multipliers to the DFT apparatus 104, sparse IDFT apparatus 108 and gradient calculation circuit 110.

The DFT components $X_n$ are multiplied in corresponding multipliers $B_n$ by correction factors $C_n$ from the gradient calculation circuit 110. These correction factors $C_n$ are fed from a plurality of corresponding calculating means $A_0, A_1 ... A_{N/2}, (A_n)$.

FIG. 2 shows calculating means $A_0$ and $A_{N/2}$ connected to receive real components $X_0$ and $X_{N/2}$ from the DFT apparatus 104 via lines 140 and to receive the output of the sparse IDFT apparatus via line 142. Calculating means $A_1, A_2 ... A_{N/2-1}$ are shown connected to receive the real and imaginary coefficients of components $X_1 ... X_{N/2-1}$ respectively from lines 144a and 144b.

In effect, each calculating means $A_n$ samples the output signal from the sparse IDFT apparatus 108 and compares this output with a reference value to provide an error signal. The error signal is cross-correlated with each of the uncorrected frequency components to find the gradient of the mean square error with respect to the correction factors. The result of each cross-correlation is used to adjust the correction factors $C_n$ for each component n = 0, 1 ... N/2 as set forth more fully herein.

Figure 3:
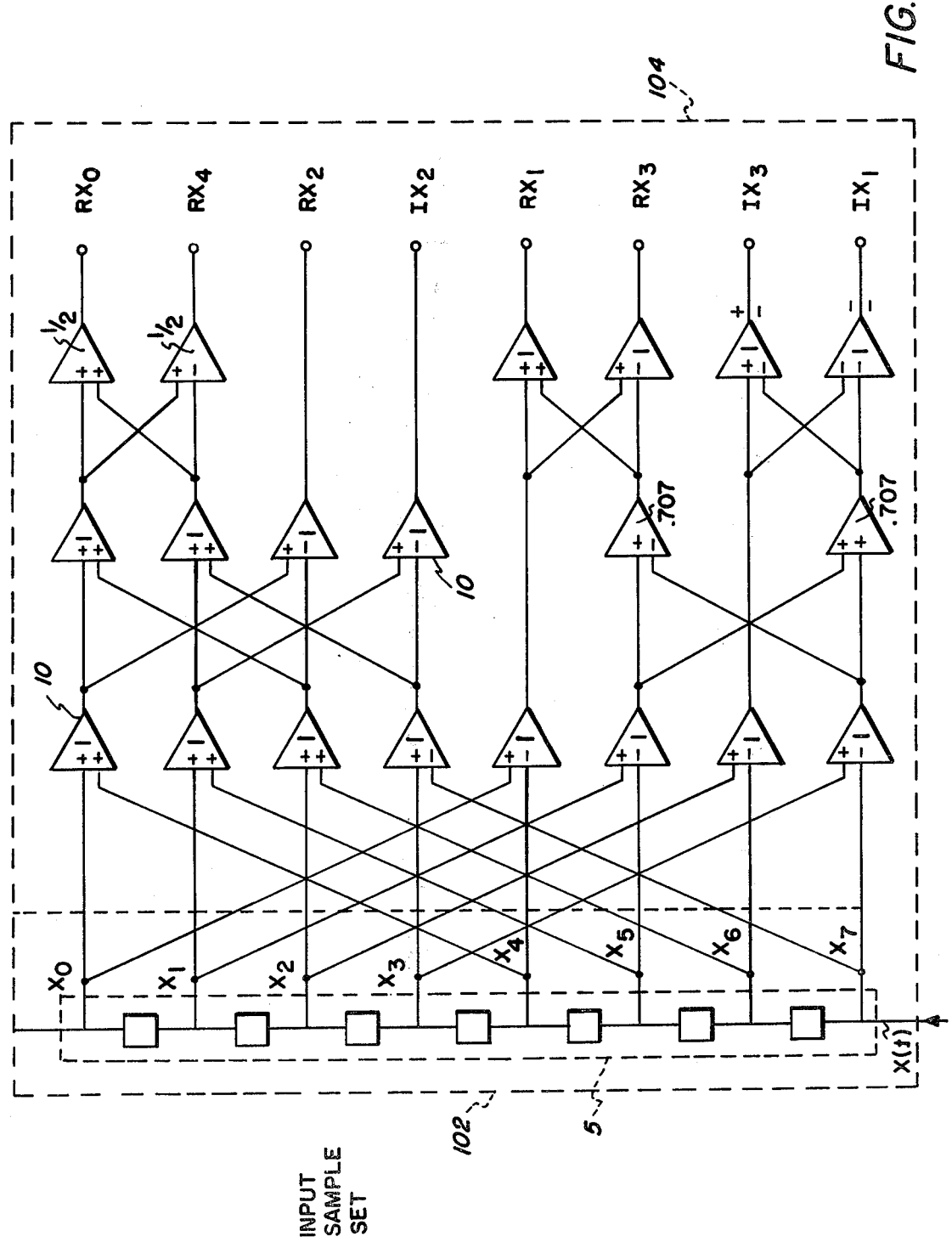
FIG. 3 is a schematic diagram of an analog circuit for performing the discrete Fourier transform of a sample set.

FIG. 3 illustrates an embodiment of the sampling means 102 and DFT apparatus 104. Sampling means 102 comprises a tapped delay line 5. For the sake of illustration, N is taken to be 8, and sample values $x_0 ... x_7$ are shown connected to the taps of delay line 5. The DFT apparatus 104 comprises an analog circuit wherein a plurality of operational amplifiers 10 have input terminals marked "+" or "−" for indicating the additive or subtractive function performed therein. The gain of the amplifiers is indicated by the multiplication factor shown. All amplifiers have unity gain except those having gain 0.707 and 0.5. If more than eight sample points are used to increase the range of the equalizer, the structure of FIG. 3 would be expanded and would include additional non-unity gain amplifiers.

The incoming signal x(t) may be a digital signal, and, even in the analog case, a digital shift register may be employed in place of the delay line 5 provided the incoming signal is first digitized (via an A/D converter, for example). In such a case, the digitized shift register output would be converted to analog form (via a D/A converter) and used in the analog DFT circuit shown in FIG. 3. Thus, any equivalent for the tapped delay line or for the digital shift register may be used to provide the sample set to the DFT apparatus 104.

The output of the analog DFT apparatus is indicated by terminals labelled $RX_n$ for the real coefficients and $IX_n$ for the imaginary coefficients. For N = 8, $IX_0 = IX_4 = 0$, and $X_1$, $X_2$ and $X_3$ are commplex. Similarly, RH, IH and RD, ID designate respectively the real and imaginary parts of the respective transfer function H and D. Analog DFT circuitry is described more generally, for example, in copending and commonly assigned application entitled "Time Domain Automatic Equalizer With Frequency Domain Control", Ser. No. 691,808, filed June 1, 1976, now U.S. Pat. No. 4,027,258 and in U.S. Pat. No. 3,851,162 to Robert Munoz, the whole of both references being hereby incorporated herein by reference.

Figure 4A:
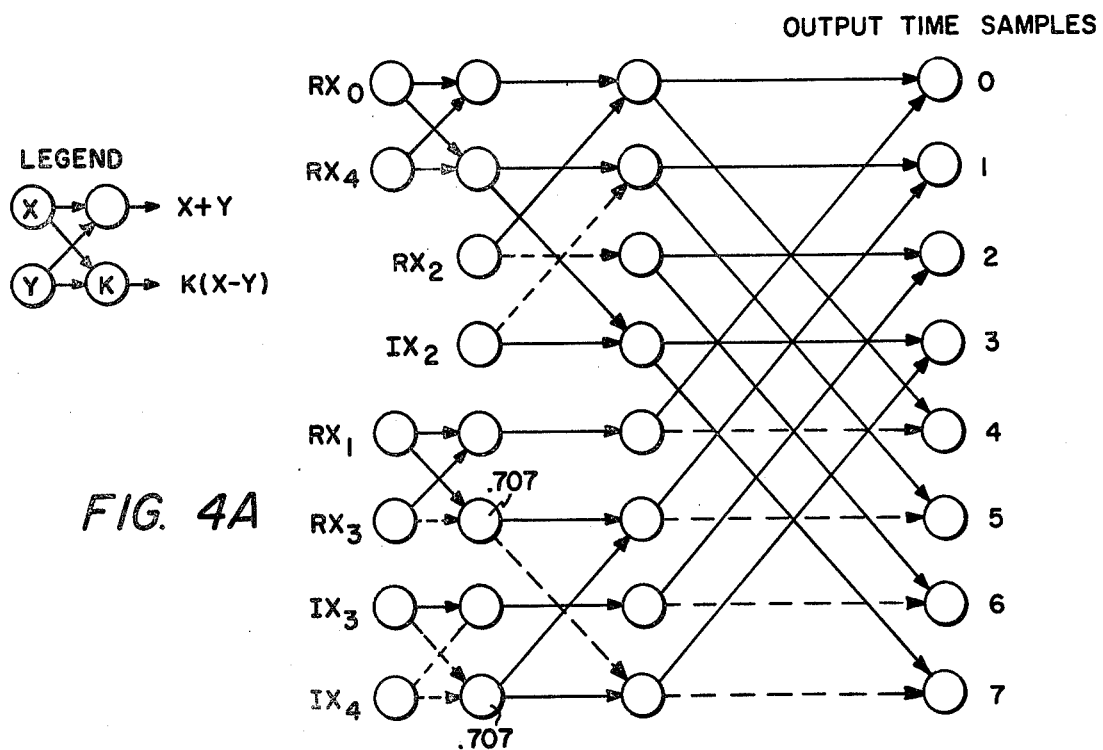
FIG. 4A illustrates a tree graph for the inverse discrete Fourier transform.
Figure 4B:
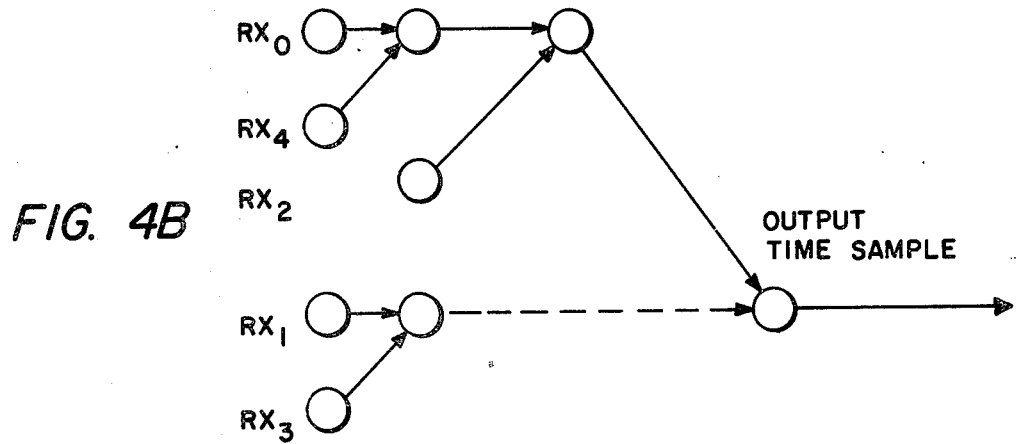
FIG. 4B illustrates a tree graph for the sparse inverse discrete Fourier transform.
Figure 4C:
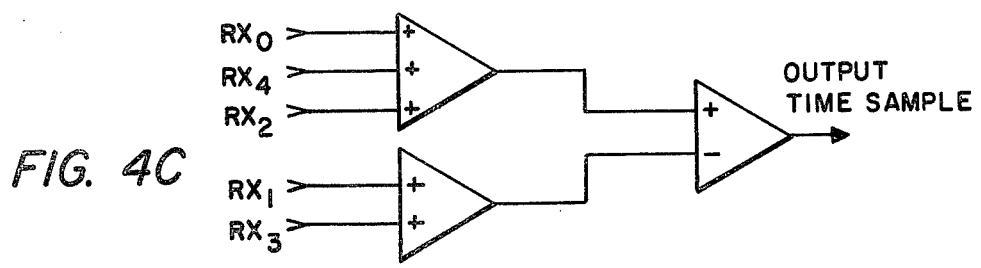
FIG. 4C is a schematic diagram of an analog implementation of the tree graph algorithm of FIG. 4B.

The inverse of the DFT may be performed quite straightforwardly by reversing the DFT apparatus of FIG. 3. A tree graph for the IDFT is shown in FIG. 4A where the inputs are the real and imaginary spectral components of the non-redundant vectors $X_n$. In FIG. 4A each node represents a variable and each arrow indicates by its source the variable which contributes to the node at its arrowhead. The contribution is additive. Dotted arrows indicate that the source variable is to be negated before adding, i.e., it is to be subtracted. Change in weighting, i.e., multiplication, is indicated by a constant written close to an arrowhead. In the sliding window sampling of the instant invention significant circuit simplicity is provided in using only a single output of the IDFT. The simplest approach is to utilize the inverse transforms which require only real inputs thus eliminating complex multiplication. Accordingly, FIG. 4B shows a "sparse" IDFT for the $4^{th}$ time sampling, and FIG. 4C shows an analog implementation of FIG. 4B. The output signal at the $4^{th}$ time sampling is representative of the input signal sample $x_3$, for an input sample set $x_0 \ldots x_7$. A subsequent input sample set is taken later, shifted in time by a fixed amount $t_0$, where generally $0 < t_0 \leq T/N$ and T is the sample set window, to provide a sample set $x_0 \ldots x_7$. The $4^{th}$ output sample is again representative of the $4^{th}$ input time sampling, namely $x_3$. The input sample is again taken shifted by $t_0$ and the process repeated to provide a sliding window input. There is therefore a one-to-one correspondence between the number of samples from the IDFT and the number of signal sample sets. Thus, the output signal can be continuous if the input is continuous, as for example in utilizing an analog delay line, or the output can be sampled if the input is sampled, as, for example, in utilizing an input shift register.

Figure 5:
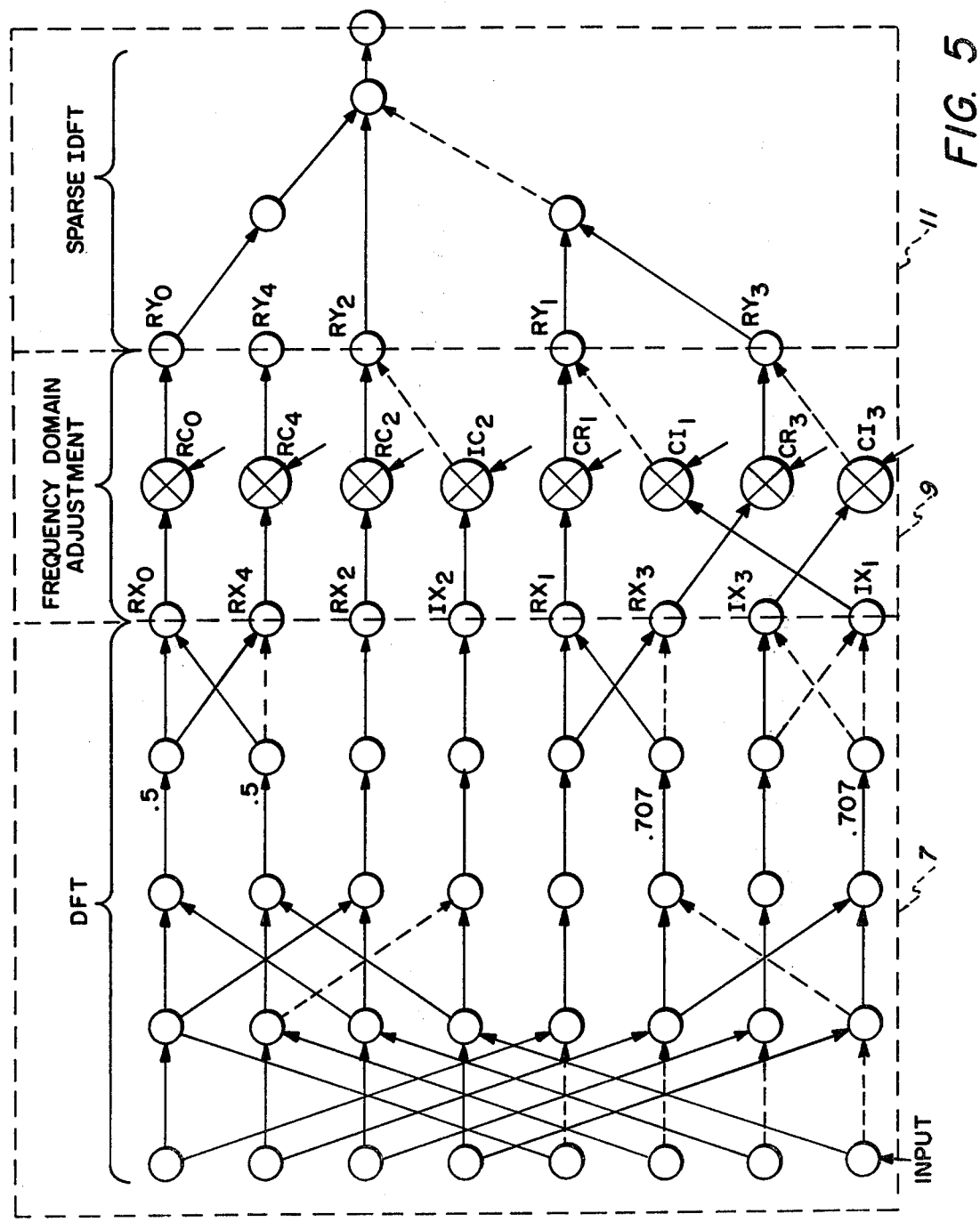
FIG. 5 is a tree graph for the complete equalization.

FIG. 5 illustrates a tree graph for the complete equalization process operating in a running mode. The DFT of the input sample set $x_0 \ldots x_{N-1}$ for N = 8 is computed in section 7. The frequency domain adjustment is done in section 9, and the sparse inverse DFT is performed in section 11. As is readily apparent, sections 7 and 11 correspond to FIGS. 3 and 4B respectively. The frequency domain equalization is achieved by multiplying each spectral coefficient $X_n$ by a correction factor $C_n$ which is simply a component of the transfer function of the equalizer C(w). Thus, $$Y_n = X_n \cdot C_n \qquad n = 0,1\ldots N/2 \qquad (1)$$

The equalized spectral components, $Y_n$, are then inverse transformed by the IDFT to provide the time domain representation of the input sample set.

The multiplication in equation (1) is performed component-by-component and may be considered the equivalent of a vector dot product multiplication. Indeed, within the frequency domain the equivalent transfer function of two transfer functions in series is the component-by-component product of the two functions, and there are no cross products as in the case of convolutions. The multiplication indicated in section 9 of FIG. 5 and by equation (1) is a complex multiplication for complex components $X_1$, $X_2$ and $X_3$ and a simple multiplication for real components $X_0$ and $X_4$. In both cases, however, only the real results of the multiplication, namely $RY_n$ are in fact generated inasmuch as the sparse inverse transform requires only real inputs. The spectral adjustment of FIG. 5 takes place in the frequency domain and provides an in-line system for automatically equalizing the incoming signals.

Frequency-Zero Forcing (FZF)

Before proceeding to the minimum mean square error (MMSE) approach of the instant invention, one may derive, by way of background, the desired correction factor formula for the special case where both d(t) and c(t) (for C(w) = 1/D(w)) are within the range of the equalizer. This premise and resulting derivation defines a frequency zero-forcing (FZF) process. We define a test signal sampled at the Nyquist rate, h(t), to be the ideal Nyquist response such that $h_k$, the ideal sample value of h(t), contains a single unit sample. This requirement of h(t) implies that $x_k$ have a range of non-zero values not greater than N. The test signal is transmitted during a training period prior to message transmission. In the following description, test or training signals are sequentially transmitted to set-up or initialize the equalizer to provide the components $C_n$. Instead of transmitting separate test pulses, however, a single input sample set may be held in storage and utilized during the adjustment or set-up process. In this case, the adjustment steps can be made as rapidly as is consistent with proper operation of the feedback loop circuitry. It is possible to completely adjust the equalizer within one input pulse interval. Inasmuch as convergence is always assured for the FZF technique and is not dependent on step size, the steps may be made as large as desired consistent with the accuracy need in the final setting.

It is contemplated that a pseudorandom sequence of pulses may be utilized instead of the isolated pulses h(t). The transmitted pseudorandom sequence is stored at the receiver and treated similarly as described hereinafter for the isolated pulses h(t).

During the adjustment process the ideal training pulses having known characteristics are transmitted. The ideal received signal is h(t), the impulse response of H(w). However, the actual received test signal is f(t), the impulse response of F(w) = H(w) D(w). It is intended that C(w) should equal 1/D(w). For the test pulses f(t) one can write the following for each frequency component n:

$$F = RF + jIF$$
$$F = (RH + jIH) \cdot (RD + jID)$$
$$F = (RHRD - IHID) + j(RHID + RDIH); j = \sqrt{-1} \quad (2)$$

and since, $$C(W) = \frac{1}{D(w)} = \frac{H(w)}{F(w)}, \text{ then for each component } n:$$

$$C = \frac{RH + jIH}{RF + jIF}$$

$$C = \frac{(RH + jIH)(RF - jIF)}{(RF)^2 + (IF)^2}$$

$$C = \frac{RHRF + IHIF}{(RF)^2 + (IF)^2} + j\frac{(RFIH - RHIF)}{(RF)^2 + (IF)^2}$$

The DFT performed at the receiver can produce a set of coefficients for each input sample set i representing RF and IF at discrete frequencies. Also, since h(t) is known, the coefficients RH and IH at these same frequencies are known. With this information a sample version of $1/D(w)$ can be produced and used to equalize any signal which is subsequently transmitted through $D(w)$. The equalization function $1/D(w)$ can be written as $1/D(w) = C(w) = RC + jIC$ where $$RC = \frac{RHRF + IHIF}{(RF)^2 + (IF)^2} \quad (3A)$$

$$IC = \frac{RFIH - RHIF}{(RF)^2 + (IF)^2} \quad (3B)$$

Utilizing equation (1) the equalized spectral coefficients $RY_n$ and $IY_n$ are given by:

$$Y_n = RY_n + jIY_n = X_n \cdot C_n$$
$$= (RX_n + jIX_n) \cdot (RC_n + jIC_n)$$
so that,
$$RY_n = RX_n RC_n - IX_n IC_n \quad (4A)$$

$$IY_n = IX_n RC_n + RX_n IC_n \quad (4B)$$

Once values for $RC_n$ and $IC_n$ are known, equation (4A) is utilized to provide the real coefficient $RY_n$ for input to the sparse IDFT apparatus. The output of the sparse IDFT, $y_k$, may be written from the equalized values $RY_n$ as follows:

$$y_k = \frac{2}{N} \sum_{n=0}^{N/2} (-1)^n RY_n \quad (5)$$

Only real coefficients are required by the sparse IDFT apparatus.

The instant invention provides the correction factors, $C_n$, by a convergent series of successive approximations utilizing a least mean square error criteria. An alternate approach to providing the correction components $C_n$ is by means of a more direct calculation technique and is described in the aforementioned copending application. Yet a further approach to providing the correction factors $C_n$ is shown in logic circuitry using the algebraic signs of error signals in an iterative technique as more fully described in copending and commonly assigned application entitled "Frequency Domain Automatic Equalizer Having Logic Circuitry", Ser. No. 691,809, filed June 1, 1976, now U.S. Pat. No. 4,027,257, which is hereby incorporated herein by reference.

When both d(t) and c(t) are within the range of the equalizer the resulting equalization is complete, i.e., the equalizer output will equal the ideal output at all instants of time. It is not, however, always possible, nor feasible, to guarantee that N will be large enough to accommodate any distortion encountered. The question then arises as to what type of equalization is obtained when the range of the frequency-zero-forcing equalizer is exceeded. In such a case, the FZF equalizer will continue to exactly equalize the bandwidth at the discrete controlled frequencies, but in between these frequencies, the response of the equalizer will depart from the ideal equalization. The equalizer thus always forces zero-error at the discrete frequencies, hence the nomenclature. Such performance is intuitively reasonable since information outside the range of time sample corresponds to high frequency ripples in the frequency domain which cannot be represented, in the sampling theory sense, with the number of discrete frequencies resulting from the Fourier transform. The FZF performance is analogous to zero-forcing in the time domain (transversal equalizer) and similarly is liable to produce a net result worse than no equalization at all, when grossly overloaded.

Minimum Mean-Square-Error (MMSE)

It is desirable to be able to minimize the output error of the equalizer by optimizing the setting of a limited range equalizer in some definable sense regardless of the extent of the distortion. The minimum mean-square-error criteria is selected.

The mean-square-error at the output of the equalizer can be defined and minimized whether or not the input and/or output exceeeds the range of the equalizer. Let $[y_k]$, $k = 0, 1, 2, \ldots (M-1)$, be the output sample sequence where $M = N + N_1$, N is the length of the equalizer and $N_1$ is the length of the input sample sequence $[X_i]$. Note that $N_1$ may be greater than N. Let $[h_k]$, $k = 0, 1, 2, \ldots (M-1)$ be the ideal output sequence. Normally the non-zero samples of $[h_k]$ will be a much shorter sequence than the non-zero samples of $[y_k]$. In particular, there may be only one non-zero sample in $[h_k]$. The error of a particular output sample is $e_k = y_k - h_k$, and the total squared error of the output sequence is $$\epsilon = \sum_{k=0}^{M-1} |e_k|^2 = \sum_{k=0}^{M-1} |y_k - h_k|^2 \quad (6)$$

This error can be written as a function of the equalizer correction factors. Each sample $y_k$, of the actual output is given by the single sided spectrum of equation (5). Each sample, $h_k$, of the ideal output can be written in the same form. Then, since the transform of the sum (or difference) of two signals is equal to the sum (or difference) of the transforms of the two signals, the error in the $k^{th}$ output sample is $$e_k = \frac{2}{N} \sum_{n=0}^{N/2} (-1)^n (RY_{nk} - RH_{nk})$$

In the double index notation $RY_{nk}$, n is the frequency index within the equalizer and k is the index of the sample set. Substituting from equation (4A) gives, $$e_k = \frac{2}{N} \sum_{n=0}^{N/2} (-1)^n (RX_{nk} RC_n - IX_{nk} IC_n - RH_{nk}) \quad (7)$$

The total squared error of the complete output sequence is $$\epsilon = \sum_{k=0}^{M-1} |e_k|^2 = \qquad (8)$$

$$\sum_{k=0}^{M-1} | \frac{2}{N} \sum_{n=0}^{N/2} (-1)^n (RX_{nk}RC_n - IX_{nk}IC_n - RH_{nk})|^2$$

$$IX_0 = IX_{N/2} = |A^3| = 0 \text{ for all } k.$$

With appropriate normalization, equation (8) also represents the mean-square-error. This is the quantity which is to be minimized with respect to the correction factors. Note that the correction factors, $C_n$, are not functions of k, while both the input signal and the reference signal are functions of k. Thus, as implied, the reference signal is shifted in synchronism with the input signal. Usually, the peaks are aligned, but this is not required. The minimum of $\Sigma$ is found by setting its gradient equal to zero. The gradient is zero when, $$\frac{\delta\epsilon}{\delta RC_n} = 0 \qquad n=0, 1,...N/2$$

$$\frac{\delta\epsilon}{\delta IC_n} = 0 \qquad n=1, 2,...(\frac{N}{2}-1)$$

Thus, for the real correction factors we have $$\frac{\delta\epsilon}{\delta RC_0} = \frac{2}{N} \sum_{k=0}^{M-1} 2RX_{0k}e_k = 0$$

$$\frac{\delta\epsilon}{\delta RC_1} = -\frac{2}{N} \sum_{k=0}^{M-1} 2RX_{1k}e_k = 0$$

or, in general $$\frac{\delta\epsilon}{\delta RC_n} = \frac{2}{N} \sum_{k=0}^{M-1} (-1)^n 2RX_{nk}e_k = 0 \quad n=0, 1... \frac{N}{2} \qquad (9)$$

For the imaginary correction factors $$\frac{\delta\epsilon}{\delta IC_n} = \frac{2}{N} \sum_{k=0}^{M-1} (-1)^{n+1} 2IX_{nk}e_k = 0 \qquad (10)$$

$$n=1, 2,...(\frac{N}{2}-1)$$

Since $e_k$ is a function of all the correction factors (equation (7)), these N partial derivatives set equal to zero form as a set of N simultaneous equations in N unknowns which can be solved for the correction factors. However, such a soution requires matrix inversion or equivalent and is thus cumbersome and not usually desirable for implementation. As disclosed herein, an iterative solution is utilized which has the advantage of allowing more practical hardware implementation than matrix inversion techniques. Equations (9) and (10) indicate that the mean-square-error is minimized when the correlations between the output error and each of the frequency component coefficients of the received signal are zero. The minimization condition is generally approachable by a gradient search technique since the mean-square-error, equation (8) is convex. To track the gradient, each correction factor is incremented in the opposite polarity to its associated derivative and by a suitably small step and thus, one may write $$\Delta RC_n = -\alpha \frac{\delta\epsilon}{\delta RC_n} = -\frac{4\alpha}{N} \sum_{k=0}^{M-1} (-1)^n RX_{nk}e_k \qquad (11)$$

$$n=0,1,... \frac{N}{2}$$

$$\Delta IC_N = -\alpha \frac{\delta\epsilon}{\delta IC_N} = -\frac{4\alpha}{N} \sum_{k=0}^{M-1} (-1)^{n+1} IX_{nk}e_k \qquad (12)$$

$$n=1,2,... \frac{N}{2} - 1$$

The maximum step size weighting, $\alpha_{max}$, for which convergence is guaranteed is related to the maximum eigen-value of the system of simultaneous equations and is thus a function of the distortion. $\alpha_{max}$ produces the fastest convergence. Very rapid convergence is usually feasible since the spectral coefficients tend to be orthogonal, and are in fact orthogonal when the range of the equalizer meets the requirements discussed above.

In setting up the equalizer one may assume that the input sample is an isolated test pulse which is repeated every M sample times (M is chosen so that there are at least N zero samples separating the worst case expected response of the system, where N is the length of the equalizer). According to equations (11) and (12), the output error is to be multiplied by the frequency coefficient at each sample time and the results summed over M samples. Thus operations may be done independently and simultaneously for each coefficient. The individual sums are each weighted by the step size factor, $\alpha$, and then the associated correction factors are each incremented by the negative of the respective results. Implemention of this algorithm is shown in block schematic form in FIGS. 2 and 7.

The details of the sampling means 102, DFT apparatus 104 and IDFT apparatus 108 have already been illustrated in FIGS. 2 and 4C. Moreover, the tree graph for the frequency domain equalizer is shown in FIG. 5. The details of the multipliers $B_n$ and calculating means $A_n$ are now set forth so as to achieve the algorithm of equations (11) and (12).

Figure 6A:
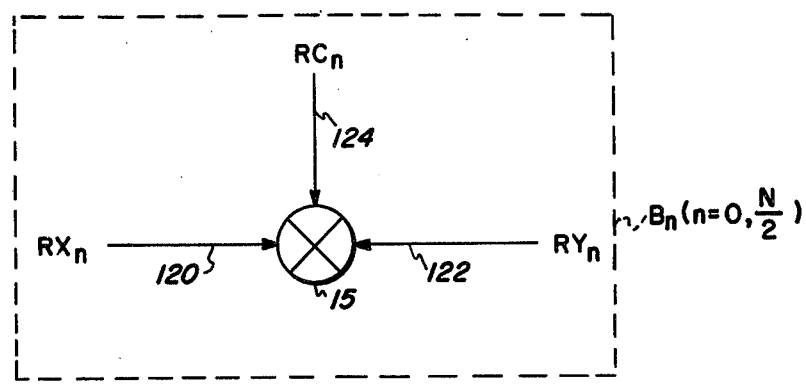
FIG. 6A is a schematic diagram of a simple multiplier for use in the equalizer of FIG. 2.

Simple multipliers $B_0$ and $B_{N/2}$ of FIG. 2 are shown in FIG. 6A and comprise a single multiplier 15. The correction factor $C_n$, the output $Y_n$, as well as component $X_n$ for n = 0 and N/2 are purely real although they are designated with the prefix "R" for the sake of uniformity.

Figure 6B:
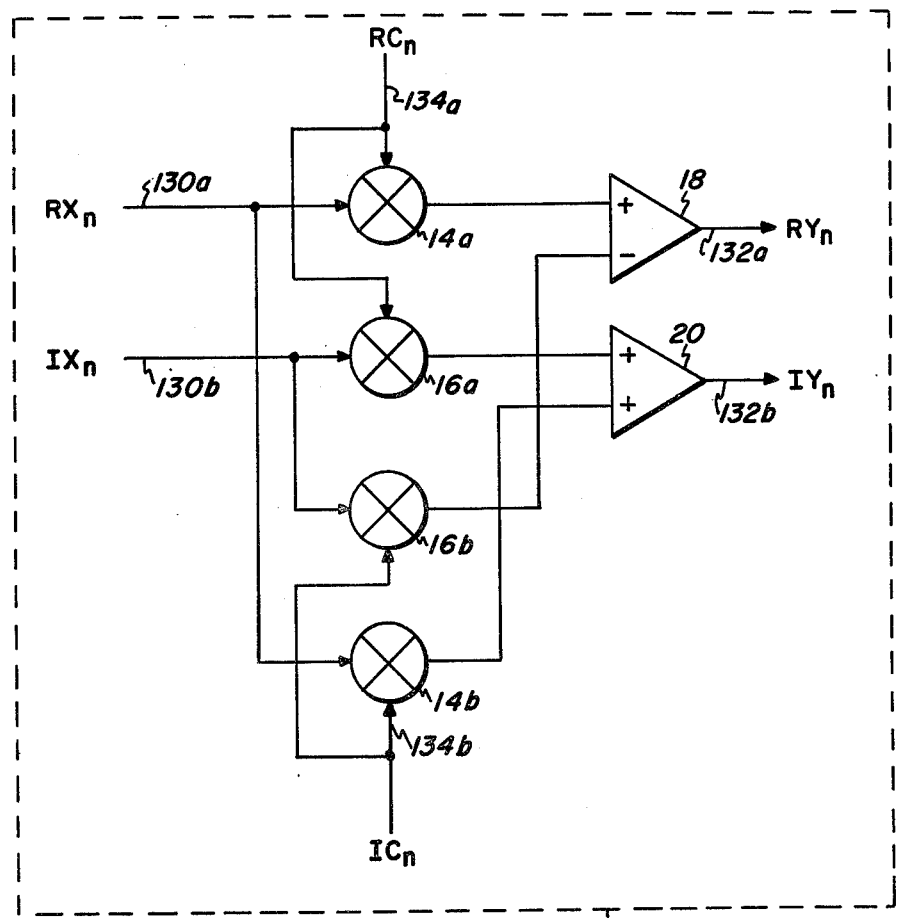
FIG. 6B is a schematic diagram of a complex multiplier for use in the equalizer of FIG. 2.

The complex multipliers $B_1$... $B_{N/2-1}$ are shown in FIG. 6B and comprise multipliers 14a, 14b and 16a, 16b together with operational amplifiers 18 and 20. The output $RY_n$ of operational amplifier 18 is given by equation (4A), whereas the output of $IY_n$ of operational amplifier 20 is given by equation (4B).

Figure 7B:
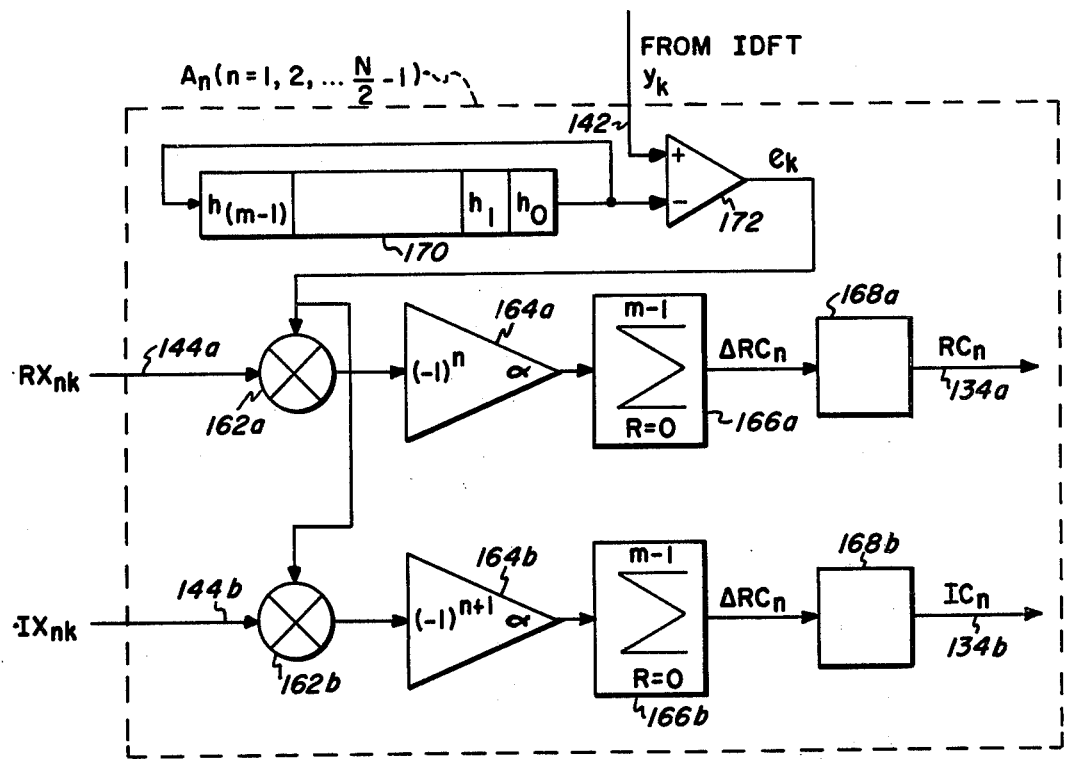
FIG. 7A and 7B are schematic diagrams of the calculating means used in the gradient calculating circuit of FIG. 2.
Figure 7A:
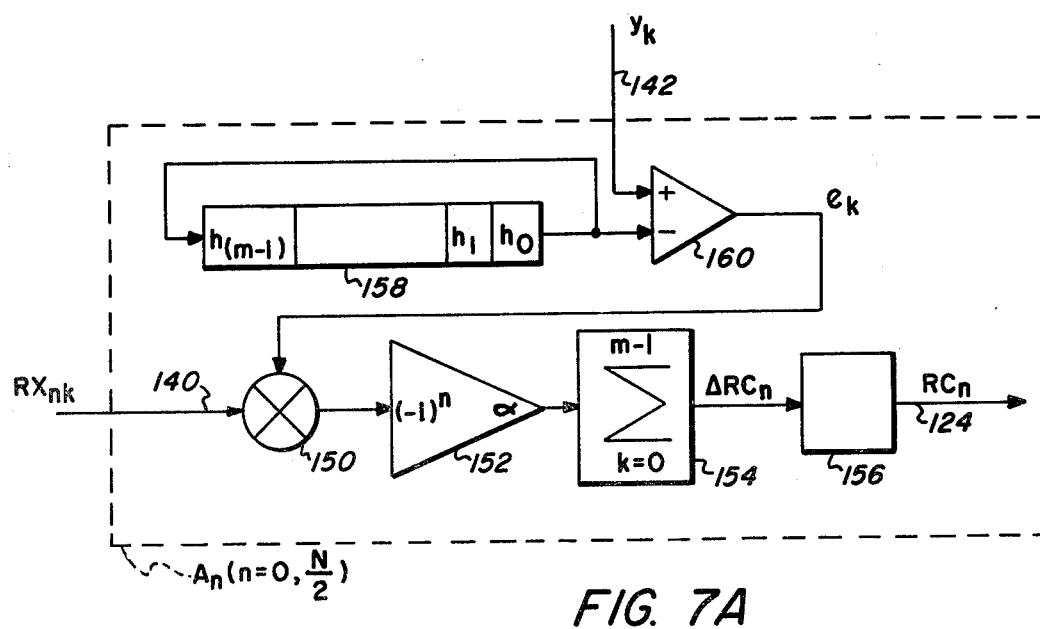

FIG. 7A is a schematic diagram of the calculating means $A_0$ and $A_{N/2}$ and comprises multiplier 150, amplifier 152, summer 154, holding circuit 156, recirculating shift register 158 and difference amplifier 160. One input to the difference amplifier 160 is connected via line 142 to receive the output $y_k$ (where k = 0 or 4 preferably), and the other input is connected to receive the predetermined ideal reference sample values $h_k$. Typically, all values of $h_k$ are zero except one. The error or difference signal $e_k$ is multiplied by the appropriate coefficient $RX_{nk}$ in multiplier 150 and the result multiplied by $(-1)^n\alpha$ in amplifier 152 where $\alpha$ is a preselected step size. The output of amplifier 152 is fed to summer 154 where a running tabulation for k = 0,1...M−1 is accumulated. It is to be recalled that M = N + N$_1$ where N$_1$ is the full number of samples corresponding to x(t). Thus, the summation of k from 0 to M−1 represents shifting the samples in an overlapping sample fashion completely through the equalizer window N. The output of summer 154 is connected to a holding circuit 156 which stores the most recent value for $RX_n$. The value of $RC_n$ is changed (increased or decreased)

by the amount $\Delta RC_n$ from summer 154. The output of holding circuit 156 of calculating means $A_0$ and $A_{N/2}$ is connected respectively via lines 124 to the real multipliers $B_0$ and $B_{N/2}$ to apply correction signals thereto.

FIG. 7B is a schematic diagram of the complex counterpart of FIG. 7A for calculating means $A_1, A_2 \ldots A_{N/2-1}$. Each complex multiplying means comprises multiplier 162a-b, amplifiers 164a-b, summers 166a-b, holding circuits 168a-b, recirculating shift register 170 and difference multiplier 172. The interconnections of the component parts of the complex calculating means is similar to that for the real calculating means of FIG. 7A although now both real and imaginary incremental correction factors $\Delta RC_N$ and $\Delta IC_N$ are provided according to equations (11) and (12). Current values of $RC_n$ and $IC_n$ from the holding circuits 168a and 168b of calculating means $A_1 \ldots A_{N/2-1}$ are connected respectively to complex multipliers $B_1 \ldots B_{N/2-1}$ via lines 134a and 134b to supply correction signals thereto.

Timing and control signals for synchronizing the operation of the various shift registers, multipliers and summers are supplied to the gradient calculating circuit 110 and coefficient adjustment circuit 106 and sampling means 102 by the timing means 112. Timing means 112 is responsive to reception of the training pulses f(t) and message signal x(t) to effect the set-up or running modes of operaton respectively. Reference is made to the above mentioned copending applications for further details of the timing apparatus.

Figure 8:
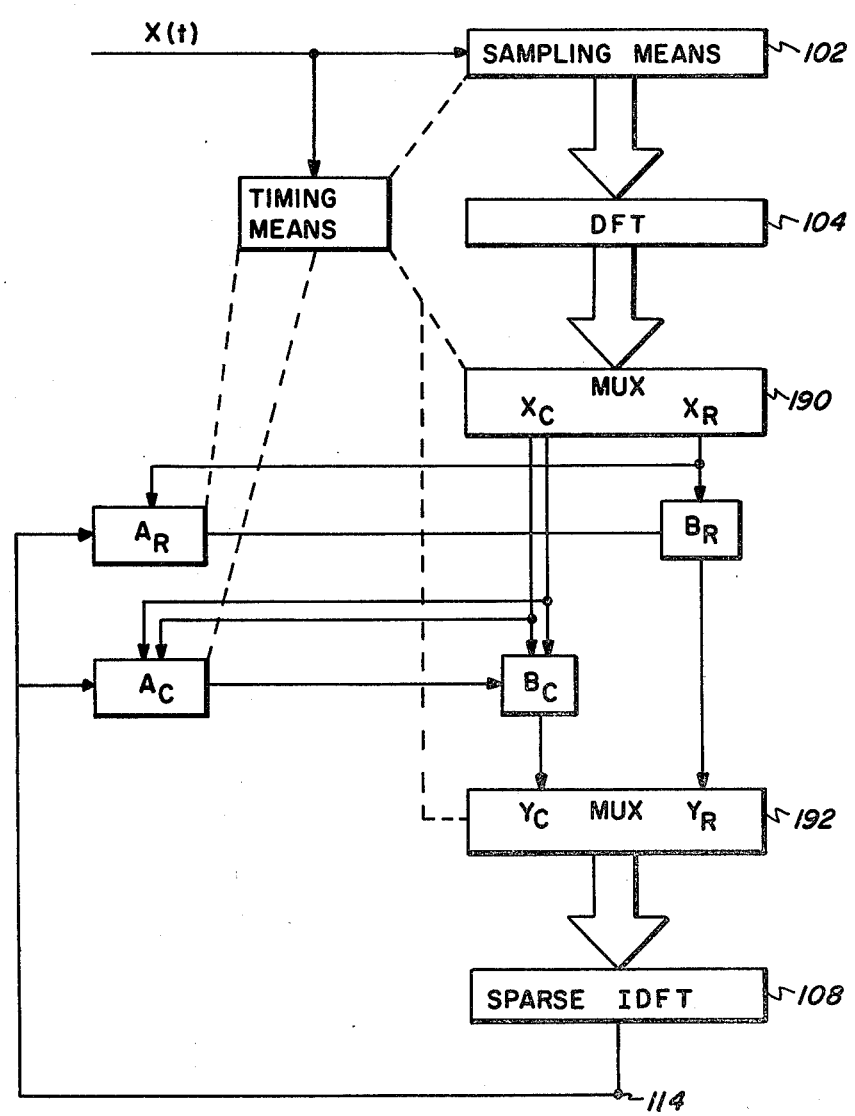
FIG. 8 is a schematic block diagram of a time-shared embodiment of an equalizer.

Instead of utilizing separate complex calculating means $A_1 \ldots A_{N/2-1}$, one may time share a single such circuit together with a time shared complex multiplier. The real components $X_0$ and $X_{N/2}$, may, of course, also utilize a separate time shared circuit. FIG. 8 is a schematic diagram of a time shared circuit where $A_c$ and $B_c$ are time shared complex equivalents of $A_1, A_2 \ldots A_{N/2-1}$ and $B_1 \ldots B_{N/2-1}$ respectively. Additionally, $A_R$ and $B_R$ represent the real time shared equivalent of $A_0$, $A_{N/2}$ and $B_0$, $B_{N/2}$, respectively. Similarly $X_R$ and $X_C$ stand for the real and complex components of $X_n$ respectively. Multiplexers 190 and 192 are utilized and synchronized via timing means 194 with sampling means 102 and DFT and IDFT apparatus as indicated. FIG. 8 may be further simplified using a single complex multiplier for both real and complex multiplication with zeros supplied to the complex inputs when real multiplications are to be performed.

While the invention has been described with reference to a particular embodiment thereof it is apparent that modifications and improvements may be made by those of skill in the art without departing from the spirit and scope of the invention.

What is claimed is:

1. A frequency domain equalizer fo equalizing a time dependent input signal, said equalizer comprising the combination of
   means for generating a frequency domain representation of said input signal;
   means for adjusting said frequency domain representation in response to correction signals;
   means for generating a time domain representation of said adjusted frequency domain representation; and
   means for calculating values for said correction signals in response to said time domain representation, with said values being calculated to provide said adjusted frequency domain representation with a mean square error having a substantially zero gradient relative to said correction signals, whereby said adjusted frequency domain representation is a equalized frequency domain version of said input signal.

2. The frequency domain equalizer of claim 1 wherein,
   said frequency domain generating means includes means for providing Fourier transform components of said input signals;
   said frequency domain adjusting means includes means for adjusting said Fourier transform components; and
   said time domain generating means includes means for generating inverse Fourier transform components of said adjusted Fourier transform components.

3. The frequency domain equalizer of claim 1 wherein
   said frequency domain generating means comprises
      means for sequentialy supplying successive sets i of serial input signal values $x_k$, where $k = 0, 1 \ldots N-1$ and N is an integer, and
      means for sequentially generating successive spectra of discrete Fourier transform components in response to said successive signal sets;
   said frequency domain adjusting means comprises means for serially adjusting the components of said successive spectra at a predetermined rate in response to time dependent values for said correction signals, thereby supplying successive groups of adjusted discrete Fourier transform components;
   said time domain generating means comprises means for serially generating inverse discrete Fourier transforms of said successive groups of adjusted Fourier transform components; and
   said calculating means comprises means for serially supplying successive values for said correction signals in response to successive ones of said inverse discrete Fourier transforms, whereby said correction signal values are serially refined at said predetermined rate to progressively converge said gradient toward zero.

4. The frequency domain equalizer of claim 3 wherein
   immediately adjacent ones of said serial input signal values $x_{k-1}$ and $x_k$ are time displaced from one another by an amount T/N, where T is a predetermined time frame, and
   the $i^{th}$ signal set is time delayed from the $i^{th}-1$ signal set by an amount $t_o$, where $0 < t_o < T/-N$,
   thereby providing for overlapping sliding window processing of said input signal.

5. The frequency domain equalizer of claim 4 wherein
   spectrally corresponding components of said successive spectra are serially adjusted in response to respective ones of said correction signals; and
   said calculating means comprises
      storage means for storing a plurality of reference values corresponding to ideal, undistorted samples of said input signal time displaced from one another by said amount $t_o$,
      comparison means for serially comparing successive ones of said reference values against successive ones of said inverse discrete Fourier transforms, thereby serially generating successive error signals, and
      means for incrementally adjusting said correction signals in accordance with successive ones of said error signals and with a polarity opposing the gradient of said mean square error, whereby said gradient is progressively reduced toward zero.

6. The frequency domain equalizer of claim 5 wherein said frequency domain generating means includes means for serially sampling said input signal at a rate N/T, thereby supplying said successive sets i of serial input signal values $x_k$.

7. The frequency domain equalizer of claim 6 wherein said signal sets i contain N, discrete input signal values, where $i \geq N + N_1 = M$;

said storage means stores a plurality of discrete, time-displaced reference values $h_{k'}$, where $k' = 0,1 .. .M-1$; and said comparison means compares successive ones of said inverse discrete Fourier transforms against successive ones of said reference values, thereby serially generating successive error signals $e_{k'}$, where $k' = 0,1 ...M-1$.

8. The frequency domain equalizer of claim 7 wherein

N is an even integer;

said input signal values $x_k$ are real; and said time domain generating means comprises means for serially generating respective sparse inverse discrete Fourier transforms $y_{k'}$, where $k' = 0,1 .. .M-1$, of the successive adjusted discrete Fourier transforms spectra.

9. The frequency domain equalizer of claim 8 wherein each of said discrete Fourier transform spectra contains $X_n$ components, where n is an integer belonging to one of the groups $y_n = 0,1 ...N/2$ and $y_n = 0,N/2, N/2+1 ...N-1$.

10. The frequency domain equalizer of claim 9 wherein said sparse inverse transform generating means generates a separate single sparse inverse discrete Fourier transform value $y_{k'}$, where $k' = 0,1 ...M-1$, for each set of input signal values $x_k$, where $k = 0,1 ...N-1$.

11. The frequency domain equalizer of claim 10 wherein said means for incrementally adjusting said correction signals comprises means for sequentially multiplying real parts $RX_{nk'}$ of spectrally corresponding components of said successive discrete Fourier transform spectra by successive ones of said error signals $e_{k'}$, thereby generating a series of simple real product signals for each of the spectrally distinct components of said spectra;

means for multiplying each of said simple real product signals by an incrementing factor $(-1)^n \alpha$, where $\alpha$ is a constant, thereby generating a series of compound real product signals for each of said spectrally distinct components; and means for independently serially summing the compound real product signals for each of said spectrally distinct components, thereby providing an independent, incrementally adjusted, real correction signal for each of said spectrally distinct components.

12. The frequency domain equalizer of claim 11 wherein said storage means comprises for each spectrally discrete Fourier transform component a recirculating shift register means for serially storing said discrete reference values $h_{k'}$, and means for serially shifting said reference values $h_{k'}$ through said shift register means at said sampling rate N/T.

13. The frequency domain equalizer of claim 3 wherein said signal sets i are generated by sampling said input signal at a rate N/T, where T is a sample time frame, and the $i^{th}$ signal set is time delayed from the $i^{th} - 1$ signal set by an amount $t_o$, where $0 < t_o < T/-N$, thereby providing overlapping, sliding window sampling of said input signal.

14. The frequency domain equalizer of claim 13 wherein said predetermined rate is selected to equal said sampling rate N/T, and said time delay $t_o$ is selected to equal N/T.

15. The frequency domain equalizer of claim 11 wherein the spectral components $X_0$ and $X_{N/2}$ of said successive discrete Fourier transform spectra are sequentially adjusted solely in response to the real correction signals for said components $X_0$ and $X_{N/2}$;

said means for incrementally adjusting said connection signals further includes means for sequentially multiplying imaginary parts $IX_{nk'}$ of spectrally corresponding components of said successive discrete Fourier transform spectra by successive ones of said error signals $e_{k'}$, thereby generating a series of simple imaginary product signals for at least each of said spectrally distinct components other than $X_0$ and $X_{N/2}$, means for multiplying each of said simple imaginary product signals by an incrementing factor $(-1)^{n+1}\alpha$, thereby generating a series of compound imaginary product signals for at least all spectrally distinct components other than $X_o$ and $X_{N/2}$, and the spectrally distinct components other than $X_o$ and $X_{N/2}$, of successive discrete Fourier transform spectra are sequentially adjusted in response to the real and imaginary connection signals provided therefor.

16. The frequency domain equalizer of claim 15 wherein said storage means comprises a separate recirculating shift register means for each of said spectrally distinct Fourier transform components, each of said shift register means storing a set of said reference values $h_{k'}$; and means for serially shifting said reference values $h_{k'}$ through each of said shift register means at said sampling rate N/T.

* * * * *